(12) United States Patent
Yoshida

(10) Patent No.: US 7,310,160 B2
(45) Date of Patent: Dec. 18, 2007

(54) FACSIMILE COMMUNICATION APPARATUS AND METHOD PERMITTING RELIABLE V.17 COMMUNICATION

(75) Inventor: Takehiro Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 678 days.

(21) Appl. No.: 10/288,429

(22) Filed: Nov. 6, 2002

(65) Prior Publication Data

US 2003/0090739 A1  May 15, 2003

(30) Foreign Application Priority Data

Nov. 15, 2001  (JP) .............................. 2001-349507
Nov. 30, 2001  (JP) .............................. 2001-365626

(51) Int. Cl.
*H04N 1/00* (2006.01)

(52) U.S. Cl. ...................... 358/1.15; 358/405; 358/436

(58) Field of Classification Search ................ 358/405, 358/435, 1.15, 1.13, 426.12, 436, 437; 379/100.05, 379/100.15, 100.17; 710/16
See application file for complete search history.

(56) References Cited

U.S. PATENT DOCUMENTS

| | | | |
|---|---|---|---|
| 4,677,660 A | 6/1987 | Yoshida | 379/100 |
| 4,727,576 A | 2/1988 | Yoshida | 379/100 |
| 5,189,696 A | 2/1993 | Yoshida | 379/355 |
| 5,255,311 A | 10/1993 | Yoshida | 379/100 |
| 5,257,114 A | 10/1993 | Yoshida et al. | 358/448 |
| 5,585,939 A | 12/1996 | Yoshida | 358/438 |
| 5,619,344 A | 4/1997 | Yoshida et al. | 358/468 |
| 5,640,250 A | 6/1997 | Yoshida | 358/468 |
| 5,659,401 A | 8/1997 | Yoshida | 358/442 |
| 5,682,248 A | 10/1997 | Yoshida | 358/404 |
| 5,717,744 A | 2/1998 | Yoshida et al. | 379/100 |
| 5,784,179 A | 7/1998 | Yoshida | 358/498 |
| 5,812,281 A * | 9/1998 | Mukai et al. | 358/435 |
| 5,894,543 A | 4/1999 | Yoshida et al. | 395/113 |
| 5,966,430 A | 10/1999 | Yoshida | 379/100 |
| 6,075,620 A * | 6/2000 | Yoshida et al. | 358/434 |
| 6,088,129 A | 7/2000 | Yoshida | 358/439 |
| 6,122,071 A * | 9/2000 | Yoshida | 358/434 |
| 6,141,109 A | 10/2000 | Yoshida | 358/112 |
| 6,275,308 B1 | 8/2001 | Yoshida | 358/450 |
| 7,075,682 B1 * | 7/2006 | Eguchi et al. | 358/434 |

FOREIGN PATENT DOCUMENTS

| | | |
|---|---|---|
| JP | 10-290347 | 10/1998 |
| JP | 2000-228717 | 8/2000 |
| JP | 2000-261637 | 9/2000 |

* cited by examiner

*Primary Examiner*—Thomas D. Lee
(74) *Attorney, Agent, or Firm*—Fitzpatrick, Cella, Harper & Scinto

(57) ABSTRACT

This invention is to provide a facsimile communication apparatus and method in which when a receiver which supports V.34 communication receives a call, transmits an ANSam signal, and receives a CM signal indicating V.17 communication from the transmitter, V.17 communication can reliably be established. A facsimile communication apparatus for executing a protocol defined in ITU-T recommendation V.8 with respect to a partner apparatus and setting an image transmission mode executable with respect to the partner apparatus on the basis of the protocol includes an ANSam signal transmission unit, a CM signal reception units, and a control unit for, when a CM signal indicating V.17 communication is received after transmission of an ANSam signal, executing control so as not to respond to the CM signal.

8 Claims, 15 Drawing Sheets

FIG. 7
V.8 PREAMBLE

| 1 | 1 | 1 | 1 | 1 | 1 | 1 | 1 | 1 | 1 | Ten ONEs preceding each information sequence |
|---|---|---|---|---|---|---|---|---|---|---|
| 0 | 0 | 0 | 0 | 0 | 0 | 0 | 0 | 0 | 1 | Synchronization for CI sequences |
| 0 | 0 | 0 | 0 | 0 | 0 | 1 | 1 | 1 | 1 | Synchronization for CM and JM sequences |

FIG. 8
V.8 INFORMATION CATEGORIES

| Start | b0 | b1 | b2 | b3 | b4 | b5 | b6 | b7 | Stop | Category octets (b4=0) with category given by tag b0-b3 |
|---|---|---|---|---|---|---|---|---|---|---|
| 0 | 1 | 0 | 0 | 0 | 0 | X | X | X | 1 | Call function |
| 0 | 1 | 0 | 1 | 0 | 0 | X | X | X | 1 | Modulation models |
| 0 | 0 | 1 | 0 | 1 | 0 | X | X | X | 1 | Protocols |
| 0 | 1 | 0 | 1 | 1 | 0 | X | X | X | 1 | GSTN access |

FIG. 9
V.8 CALL FUNCTION CATEGORY

| Start | b0 | b1 | b2 | b3 | b4 | b5 | b6 | b7 | Stop | Octet- 'callf0' |
|---|---|---|---|---|---|---|---|---|---|---|
| 0 | 1 | 0 | 0 | 0 | | | | | | Tag b0-b3 indicating the call function category |
| | | | | | 0 | | | | | Indicates a category octet |
| | | | | | | 0 | 0 | 0 | | To be determined by the ITU-T |
| | | | | | | 1 | 0 | 0 | | To be determined by the ITU-T |
| | | | | | | 0 | 1 | 0 | | Textphone according to Recommendation V.18 |
| | | | | | | 1 | 1 | 0 | | To be determined by the ITU-T |
| | | | | | | 0 | 0 | 1 | | To be determined by the ITU-T |
| | | | | | | 1 | 0 | 1 | | To be determined by the ITU-T |
| | | | | | | 0 | 1 | 1 | | Transmit and receive data |
| | | | | | | 1 | 1 | 1 | | Call function as indicated in an extension octet |
| | | | | | | | | | 1 | Stop bit |

FIG. 10
V.8 MODULATION MODES

| Start | b0 | b1 | b2 | b3 | b4 | b5 | b6 | b7 | Stop | Octet- 'modn0' | Item |
|---|---|---|---|---|---|---|---|---|---|---|---|
| 0 | 1 | 0 | 1 | 0 | | | | | | Tag b0-b3 indicating the modulation modes category | |
| | | | | | 0 | | | | | Indicates a category octet | |
| | | | | | | 0 | | | | Reserved for future definition by the ITU-T | 0 |
| | | | | | | | X | | | 1 denotes V.34 duplex availability | 1 |
| | | | | | | | | X | | 1 denotes V.34 half-duplex availability | 2 |
| | | | | | | | | | 1 | Stop bit | |
| 0 | | | | | | | | | | Octet- 'modn1' | |
| | X | | | | | | | | | 1 denotes V.32 bis/V.32 availability | 3 |
| | | X | | | | | | | | 1 denotes V.22 bis/V.22 availability | 4 |
| | | | X | | | | | | | 1 denotes V.17 availability | 5 |
| | | | | 0 | 1 | 0 | | | | Indicates an extension octet | |
| | | | | | | | X | | | 1 denotes V.29 half-duplex availability (as used in T.30, etc.) | 6 |
| | | | | | | | | X | | 1 denotes V.27 ter availability | 7 |
| | | | | | | | | | 1 | Stop bit | |
| 0 | | | | | | | | | | Octet- 'modn2' | |
| | X | | | | | | | | | 1 denotes V.26 ter availability | 8 |
| | | X | | | | | | | | 1 denotes V.26 bis availability | 9 |
| | | | X | | | | | | | 1 denotes V.23 duplex availability | 10 |
| | | | | 0 | 1 | 0 | | | | Indicates an extension octet | |
| | | | | | | | X | | | 1 denotes V.23 half-duplex availability | 11 |
| | | | | | | | | X | | 1 denotes V.21 availability | 12 |
| | | | | | | | | | 1 | Stop bit | |

FIG. 11
V.8 PROTOCOL CATEGORY

| Start | b0 | b1 | b2 | b3 | b4 | b5 | b6 | b7 | Stop | Octet- 'prot0' |
|---|---|---|---|---|---|---|---|---|---|---|
| 0 | 0 | 1 | 0 | 1 | | | | | | Tag b0-b3 indicates the protocol category |
| | | | | | 0 | | | | | Indicates a category octet |
| | | | | | | 1 | 0 | 0 | | Calls for LAPM protocol according to V.42 |
| | | | | | | 1 | 1 | 1 | | Calls for protocol as indicated in an extension octet |
| | | | | | | | | | 1 | Stop bit |
| NOTE–Absence of this octet does not preclude alternative means of protocol negotiation ||||||||||  |

FIG. 12
V.8 GSTN ACCESS CATEGORY

| Start | b0 | b1 | b2 | b3 | b4 | b5 | b6 | b7 | Stop | Octet- 'access 0' |
|---|---|---|---|---|---|---|---|---|---|---|
| 0 | 1 | 0 | 1 | 1 | | | | | | Tag b0-b3 indicates the GSTN access category |
| | | | | | 0 | | | | | Indicates a category octet |
| | | | | | | X | | | | 1 denotes that the call DCE is on a cellular connection |
| | | | | | | | X | | | 1 denotes that the answer DCE is on a cellular connection |
| | | | | | | | | 0 | | Reserved for future definition by the ITU-T |
| | | | | | | | | | 1 | Stop bit |
| NOTE–Absence of this octet conveys no information about the type of GSTN access ||||||||||  |

FIG. 13

V.8 DEFINITION OF BITS IN INFO0 SEQUENCE

| INFO0 bits LSB : MSB | Definition |
|---|---|
| 0:3 | Fill bits : 1111 |
| 4:11 | Frame sync : 01110010, where the left-most bit is first in time |
| 12 | Set to 1 indicates symbol rate 2743 is supported |
| 13 | Set to 1 indicates symbol rate 2800 is supported |
| 14 | Set to 1 indicates symbol rate 3429 is supported |
| 15 | Set to 1 indicates the ability to transmit at the low carrier frequency with a symbol rate of 3000 |
| 16 | Set to 1 indicates the ability to transmit at the high carrier frequency with a symbol rate of 3000 |
| 17 | Set to 1 indicates the ability to transmit at the low carrier frequency with a symbol rate of 3200 |
| 18 | Set to 1 indicates the ability to transmit at the high carrier frequency with a symbol rate of 3200 |
| 19 | Set to 0 indicates that transmission with a symbol rate of 3429 is disallowed |
| 20 | Set to 1 indicates the ability to reduce transmit power to a value lower than the nominal setting |
| 21:23 | Maximum allowed difference in symbol rates in the transmit and receive directions<br><br>With the symbol rates labelled in increasing order, where 0 represents 2400 and 5 represents 3429, an integer between 0 and 5 indicates the difference allowed in number of symbol rate steps |
| 24 | Set to 1 in an INFO0 sequence transmitted from a CME modem |
| 25 | Set to 1 indicates the ability to support up to 1664-point signal constellations |
| 26:27 | Transmit clock source : 0=internal ; 1=synchronized to receive timing ; 2=external ; 3 =reserved for ITU-T |
| 28 | Set to 1 to acknowledge correct reception of an INFO0 frame during error recovery |
| 29:44 | CRC |
| 45:48 | Fill bits : 1111 |

NOTE 1—Bits 12 through 14 are used to indicate the modem's capabilities and/or configuration. The values of bits 15 through 20 depend upon regulatory requirements and apply only to the modem's transmitter.

NOTE 2—Bit 24 may be used in conjunction with the GSTN access category octet defined in Recommendation V.8 to determine the optimum parameters for the signal convertors and error-control functions in the call and answer modem and any intervening CME.

FACSIMILE COMMUNICATION APPARATUS AND METHOD PERMITTING RELIABLE V.17 COMMUNICATION

BACKGROUND OF THE INVENTION

1. Field of the Invention

The present invention relates to facsimile communication and, more particularly, to facsimile communication apparatus and method capable of ITU-T recommendation V.8 communication.

2. Related Background Art

In 1994, ITU-T recommendation V.8 has come into effect. The protocol defined by this V.8 may be applied to facsimile apparatuses. The V.8 protocol is applied to facsimile apparatuses which support the protocol and image transmission defined by V.34. The V.8 protocol refers to V.17 communication but does not clearly define it.

When a receiver that supports V.34 communication receives a call, the receiver transmits an ANSam signal. When a CM signal indicating V.17 communication is received from the transmitter, the receiver cannot completely execute V.8 communication because the subsequent V.8 communication protocol is not clearly defined. In this case, V.17 communication may fail to be established.

Additionally, when a transmitter that supports V.34 communication issues a call, receives an ANSam signal from a receiver transmits a CM signal indicating V.34 communication, and then receives a JM signal indicating V.17 communication from the receiver, the subsequent V.8 communication protocol is not clearly defined.

Hence, when V.8 communication is executed, and after that, a CI signal is transmitted in response to reception of a V.21 DIS signal indicating the presence of the V.8 receive function, V.8 communication is executed again. If this operation is repeated, V.17 communication may fail (V.17 communication is not executed). That is, the receiver may cause an operation error.

SUMMARY OF THE INVENTION

It is an object of the present invention to provide facsimile communication apparatus and method in which when a receiver which supports V.34 communication receives a call, transmits an ANSam signal, and receives a CM signal indicating V.17 communication from the transmitter, V.17 communication can reliably be established.

It is another object of the present invention to provide facsimile communication apparatus and method in which when a transmitter which supports V.34 communication issues a call, receives an ANSam signal from a receiver transmits a CM signal indicating V.34 communication, and then receives a JM signal indicating that V.34 communication is unavailable from the receiver operation error is not caused by the subsequent execution of the V.8 protocol. Therefore, the line can immediately be released to interrupt communication, and any increase in communication fee due to continuation of unavailable communication can be prevented.

BRIEF DESCRIPTION OF THE DRAWINGS

FIG. 7 is a view showing the structure of a preamble contained in the ITU-T recommendation V.8 protocol signal;

FIG. 8 is a view showing the form of category octets that determine the information category of the ITU-T recommendation V.8 protocol signal;

FIG. 9 is a view showing an example of usage of the bits of the call-function octet;

FIG. 10 is a view showing modulation modes designated by the ITU-T recommendation V.8 protocol signal;

FIG. 11 is a view showing the code list in the protocol category of the ITU-T recommendation V.8 protocol signal;

FIG. 12 is a view showing codes indicating cellular access to the GSTN connection in the ITU-T recommendation V.8 protocol signal;

FIG. 13 is a view showing bit definition of the INFO0 sequence by ITU-T recommendation V.34;

DETAILED DESCRIPTION OF THE PREFERRED EMBODIMENTS

First Embodiment

Figure 1:
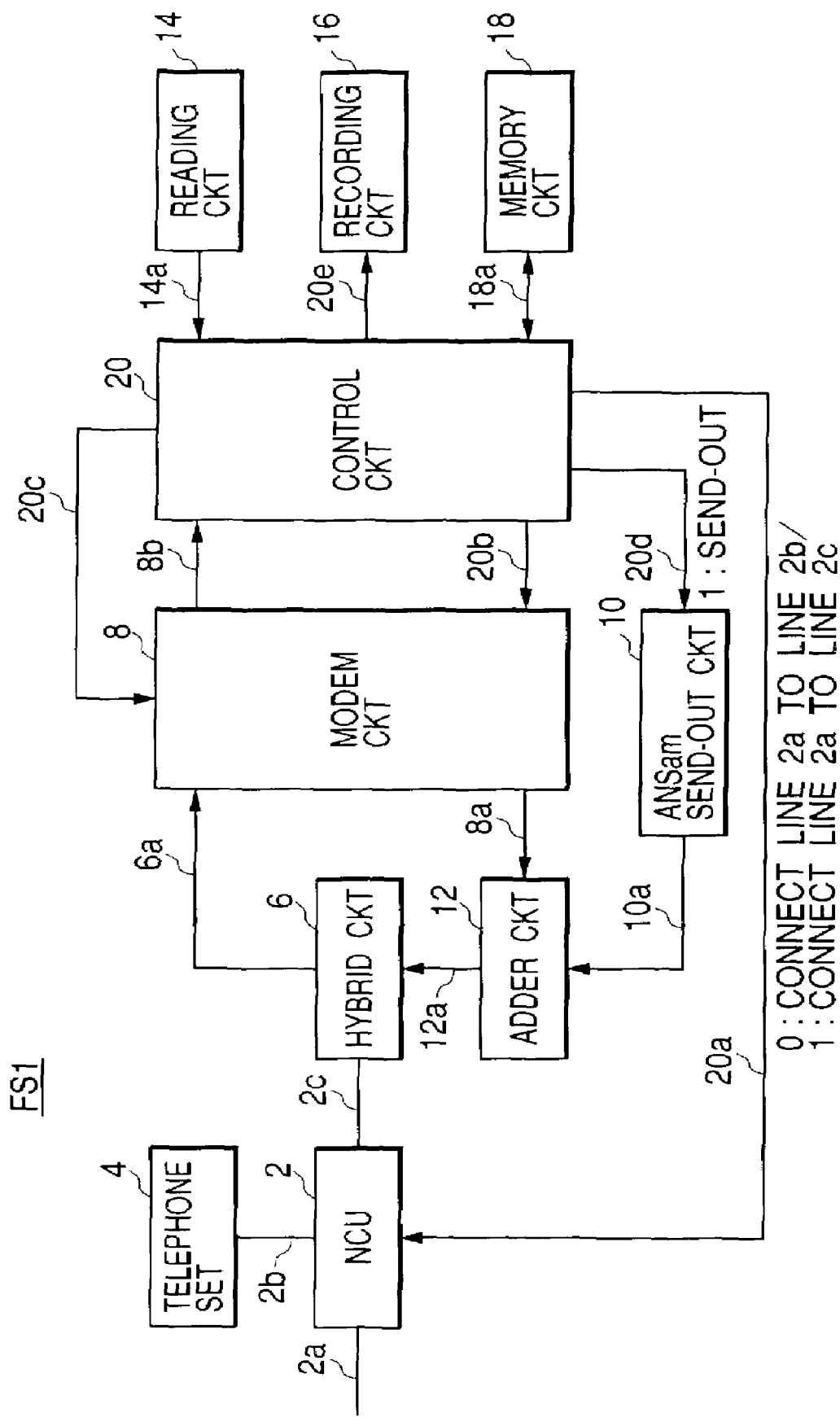
FIG. 1 is a block diagram showing a facsimile apparatus FS1 as one embodiment of the present invention.

The V.8 protocol signal recommended by ITU-T will be described first.

The V.8 protocol signal includes a call menu signal (to be referred to as a "CM signal" hereinafter), CM terminator signal (to be referred to as a "CJ" signal hereinafter), and joint menu signal (to be referred to as a "JM" signal hereinafter).

Call menu signal (CM): A signal transmitted from the call DCE primarily to indicate modulation modes available in the call DCE. CM consists of a repetitive sequence of bits at 300 bit/s, modulating V.21 (L), the low-band channel defined in ITU-T V.21.

CM terminator (CJ): A signal which acknowledges the detection of a JM signal and indicates the end of a CM signal. CJ consists of three consecutive octets of all ZEROs with start and stop bits, modulating V.21 (L) at 300 bit/s.

Joint menu signal (JM): A signal transmitted from the answer DCE primarily to indicate modulation modes available jointly in the call and answer DCEs. JM consists of a repetitive sequence of bits at 300 bit/s, modulating V.21 (H), the high-band channel defined in ITU-T V.21.

FIG. 7 is a view showing the structure of a preamble contained in the ITU-T recommendation V.8 protocol signal.

The coding format of the CM, CJ, and JM signals will be described next.

Signals CI, CM and JM use a common coding format. Each of these signals consists of a repeated sequence of bits. A sequence consists of 10 ONEs followed by 10 bits for synchronization and then information-bearing octets, each octet being preceded by a start-bit (ZERO), and followed by a stop-bit (ONE).

To avoid confusion of signal JM with T.30 signals which also use V.21 (H) modulation, a coding constraint is maintained which ensures that HDLC flags (01111110) cannot appear in the bit stream.

Each octet lies within one "information category". The coding format allows information categories to be expanded for special applications, while keeping signals brief for the majority of applications.

The first information category in a sequence shall be the call function. No particular ordering is required for subsequent information categories. All information within one category shall be carried in one octet or, when necessary, in an ordered sequence of octets.

FIG. 8 is a view showing the form of category octets that determine the information category of the ITU-T recommendation V.8 protocol signal.

Category octets will be described next.

Category octets are those which occur first in any new information category, and include a 4-bit code identifying the information category.

The format is shown below with bits listed from left to right in order of transmission:

start-bit(0) b0 b1 b2 b3 0 b5 b6 b7 stop-bit(1)

Bits b0-b3 make up the category tag with b0 the least significant bit, b4 is set to ZERO to prevent flag simulation, and bits b5-b7 are "option bits" relevant to the information category.

When 3 option bits are inadequate for a particular category, any number of extension octets may follow directly after a category octet.

The format for an extension octet is shown below:

start-bit(0) b0 b1 b2 0 1 0 b6 b7 stop-bit(1)

Bits b0-b2, b6 and b7 provide five additional option bits in the current category. Bit b4 is set to ONE in order to distinguish an extension octet from a category octet, and bits b3 and b5 are set to ZERO to prevent flag simulation.

Information categories determined by bits b0-b3, i.e., call functions, modulation modes, protocols, and GSTN access will be described next.

FIG. 9 is a view showing an example of usage of the bits of a call-function octet.

FIG. 9 shows how the 3 option bits in a call-function octet are used to identify particular call functions.

FIG. 10 is a view showing modulation modes designated by the ITU-T recommendation V.8 protocol signal.

FIG. 10 shows the coding over 3 octets to indicate availability of GSTN V-series modulation modes. Availability shall be shown only if the modulation mode can be used with the indicated call function, and if it is desired to convey that capability to the remote DCE.

FIG. 11 is a view showing the code list in the protocol category of the ITU-T recommendation V.8 protocol signal.

FIG. 11 lists codes within the protocol category.

If the LAPM protocol code is indicated in CM and the answer DCE wishes to use LAPM, a protocol octet is also transmitted in JM indicating LAPM.

FIG. 12 is a view showing codes indicating cellular access to the GSTN connection in the ITU-T recommendation V.8 protocol signal.

FIG. 12 provides codes for indicating cellular access to the GSTN connection.

Information bits of INFO0 defined in V.34 will be described next.

FIG. 13 is a view showing bit definition of the INFO0 sequence by ITU-T recommendation V.34.

INFO0 is a signal to be used to indicate the transmission capability. The bits of the signal sequence are defined as shown in FIG. 13.

In this embodiment, INFO0a is a signal sent out from the called side, and INFO0c is a signal sent out from the calling side.

FIG. 1 is a block diagram showing a facsimile apparatus FS1 as one embodiment of the present invention.

The facsimile apparatus FS1 has a network control unit (to be referred to as an NCU hereinafter) 2 connected to a telephone line 2a, as shown in FIG. 1. The NCU 2 controls connection of a telephone switching network and switches it to a data communication path, i.e., connects the telephone network to a line terminal to be used for data communication or the like. The NCU 2 selectively switches between connection of the telephone line 2a and a telephone set 4 and connection of the telephone line 2a and a hybrid circuit 6. The NCU 2 and the telephone set 4 are connected by a signal line 2b. The NCU 2 and the hybrid circuit 6 are connected by a signal line 2c.

The switching operation by the NCU 2 is controlled by a control circuit 20 (to be described later). When the control signal supplied from the control circuit 20 through a signal line 20a is "0", the telephone line 2a is connected to the telephone set 4. When the control signal is "1", the telephone line 2a is connected to the hybrid circuit 6. In a normal state, connection of the telephone line 2a and the telephone set 4 is selected.

The hybrid circuit 6 separates a transmission signal to be transmitted through the telephone line 2a and a reception signal received through the telephone line 2a.

The transmission system has a reading circuit 14 constituted by an image pickup element such as a CCD (Charge Coupled Device) and an optical system, and an ANSam send-out circuit 10.

The reading circuit 14 sequentially reads an image of one line in the main scanning direction from a transmission original. Data representing the read image is output to a signal line 14a.

The ANSam send-out circuit 10 outputs an ANSam signal to a signal line 10a upon receiving a signal of level "1" from the control circuit 20 through a signal line 20d. When a signal of level "0" is received from the control circuit 20 through the signal line 20d, the ANSam send-out circuit 10 outputs no ANSam signal to the signal line 10a.

The data output from the reading circuit 14 through the signal line 14a is supplied to the control circuit 20. The control circuit 20 encodes the data received through the signal line 14a. The encoded data is output to a modem circuit 8 through a signal line 20b.

The modem circuit 8 modulates encoded data received from the signal line 20b to generate a modulated signal. The modem circuit 8 also demodulates a reception signal received from the hybrid circuit 6 through a signal line 6a to generate demodulated data. The modulation processing and demodulation processing are executed on the basis of ITU-T recommendation V.8, V.21, V.27ter, V.29, V.17, and V.34. The contents of modulation/demodulation processing by the modem circuit 8 are instructed by a signal supplied from the control circuit 20 through a signal line 20c. A transmission mode is determined by the instructed modulation/demodulation processing.

The modulated signal generated by the modem circuit 8 is supplied to an adder circuit 12 through a signal line 8a. The adder circuit 12 adds the modulated signal from the modem circuit 8 to the ANSam signal from the ANSam send-out circuit 10. The sum signal is output to the hybrid circuit 6 through a signal line 12b. The hybrid circuit 6 sends out the sum signal to the telephone line 2a via the NCU 2 as a transmission signal.

On the other hand, in the reception system, a signal received from the partner apparatus via the NCU 2 is output from the hybrid circuit 6 to the modem circuit 8 through the signal line 6a. As described above, the modem circuit 8 demodulates the reception signal received through the signal line 6a to generate demodulated data. The demodulated data generated by the modem circuit 8 is supplied to the control circuit 20 through a signal line 8b. The control circuit 20 executes decoding or the like for the demodulated data. The decoded data is supplied to a recording circuit 16 through a signal line 20e.

The recording circuit 16 sequentially records an image represented by the decoded data on a recording paper sheet line by line.

Data read by the reading circuit 14, date obtained by encoding the read data, received data, or data obtained by decoding the data is stored in a memory circuit 18, as needed.

The control circuit 20 executes transmission control to receive information from the partner apparatus or transmit information to the partner apparatus.

The transmission control protocol that defines the transmission control uses ITU-T recommendation V.8, V.21, V.27ter, V.29, V.17, and V.34 protocols.

More specifically, in a facsimile communication apparatus which executes a protocol defined by ITU-T recommendation V.8 with respect to the partner apparatus and sets, on the basis of the protocol, an image transmission mode executable with respect to the partner apparatus, an ANSam signal transmission means and a CM signal reception means are prepared. When the apparatus transmits an ANSam signal and then receives a CM signal indicating V.17 communication, the apparatus does not respond to the CM signal. After the transmission time of the ANSam signal times out, a V.21 DTS signal is transmitted. The V.21 DIS signal transmitted here declares the absence of V.8 receive function. On the other hand, if the facsimile apparatus receives a CM signal indicating V.34 communication, the apparatus responds to the CM signal. The apparatus transmits a JM signal, and after reception of a CJ signal, executes V.34 reception.

The control operation of the embodiment will be described next.

Figure 2:
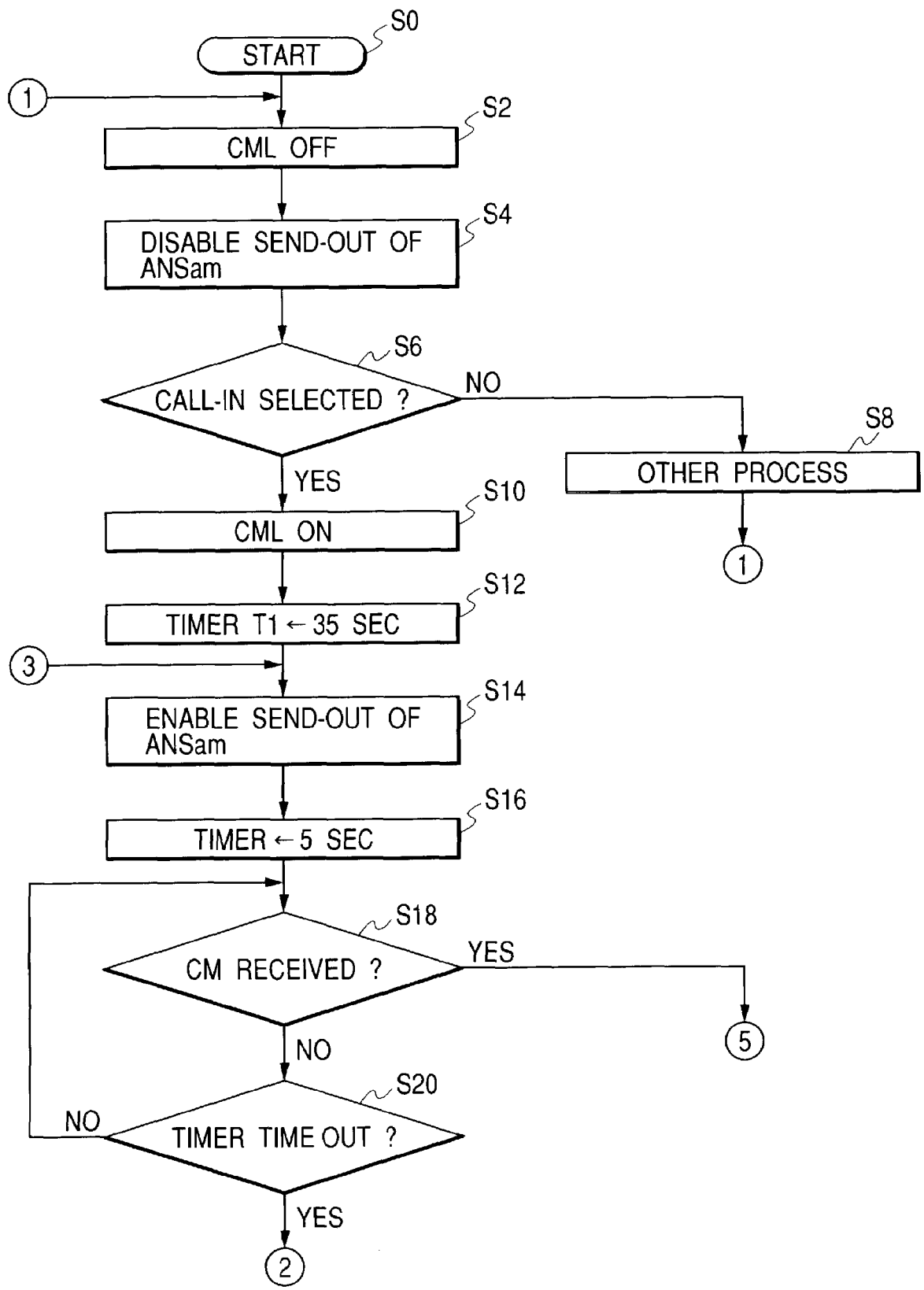
FIG. 2 is a flow chart showing the control operation of the first embodiment.
Figure 3:
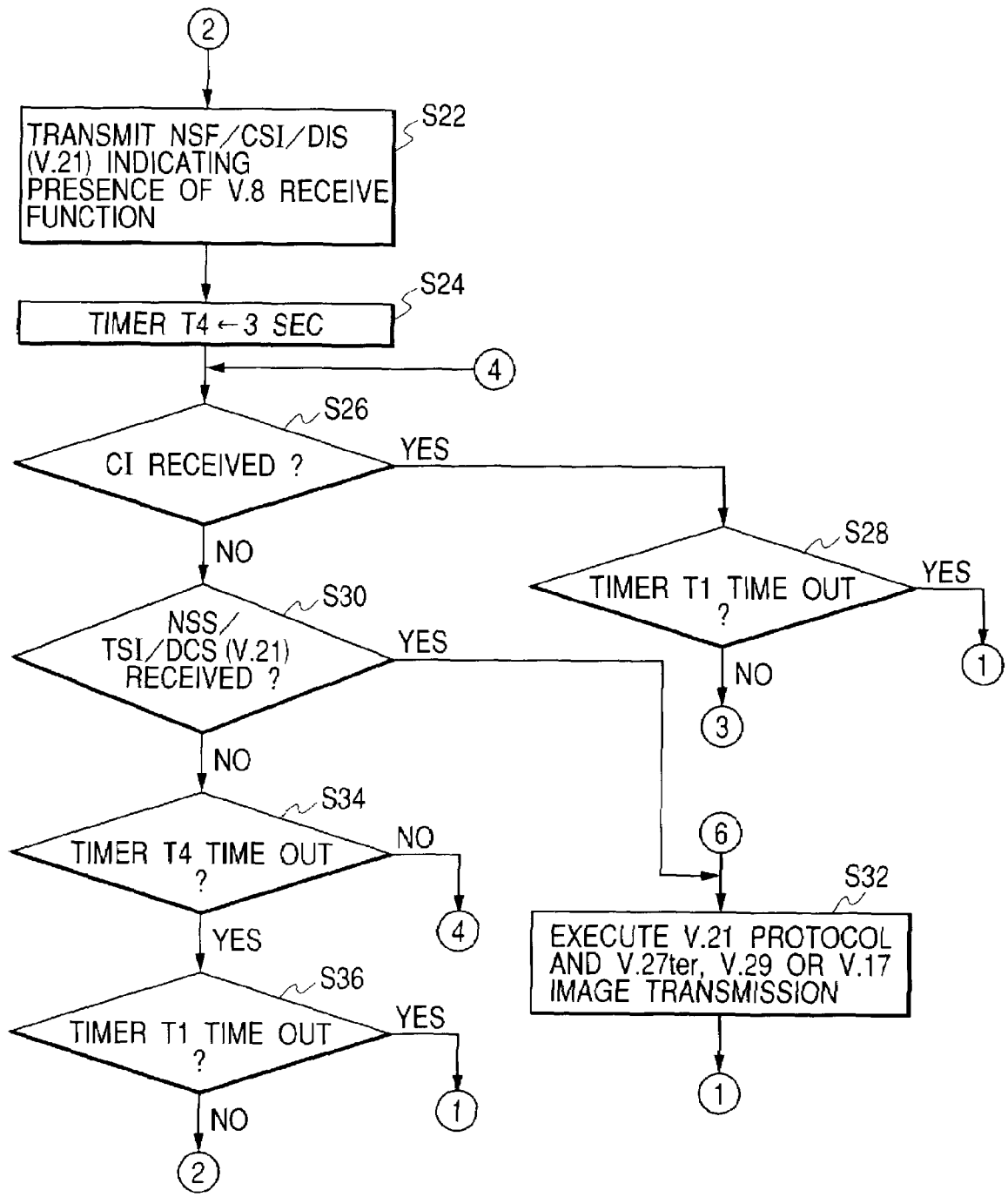
FIG. 3 is a flow chart showing the control operation of the first embodiment.
Figure 4:
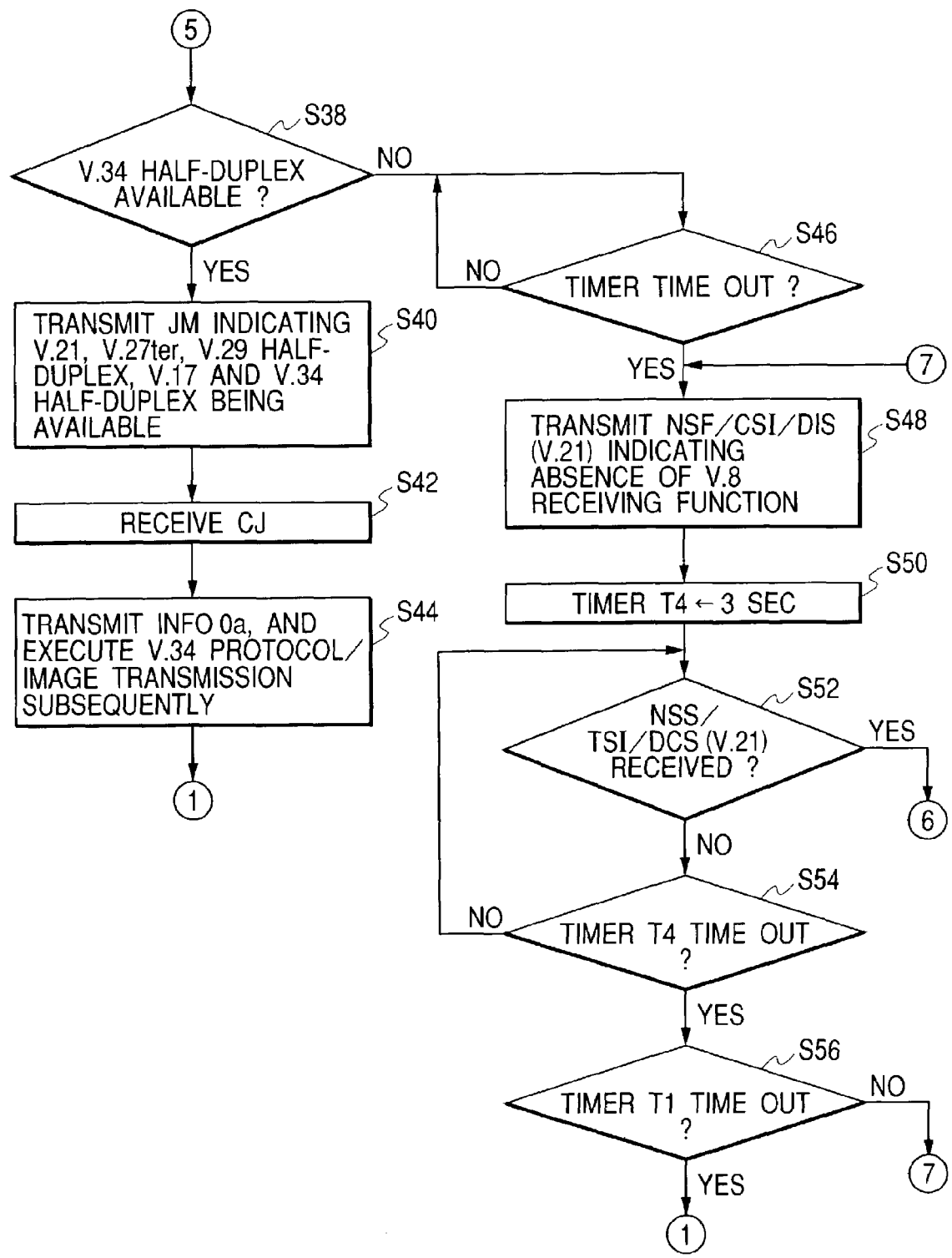
FIG. 4 is a flow chart showing the control operation of the first embodiment.

FIGS. 2, 3, and 4 are flow charts showing the control operation of the embodiment.

In step S2, a signal of level "0" is output to the signal line 20a to turn off CML. In step S4, a signal of level "0" is output to the signal line 20d to disable output of the ANSam signal.

In step S6, it is determined whether call-in is selected. If NO in step S6, the flow advances to step S8. If YES, the flow advances to step S10.

In step S8, other process is executed. After other process is executed, the flow returns to step S2. In step S10, a signal of level "1" is output to the signal line 20a to turn on CML.

In step S12, 35 sec is set to a timer T1. In step S14, a signal of level "1" is output to the signal line 20d to enable output of the ANSam signal. In step S16, 5 sec is set to the timer.

In step S18, it is determined whether the CM signal is received. If YES in step S18, the flow advances to step S38. If NO, the flow advances to step S20.

In step S20, it is determined whether the timer has timed out. If YES in step S20, the flow advances to step S22. If NO, the step returns to step S18.

In step S22, an NSF/CSI/DIS signal of V.21 signal is transmitted to indicate the presence of the V.8 receive function. In step S24, 3 sec is set to a timer T4. In step S26, it is determined whether a CI signal is received. If YES in step S26, the flow advances to step S28. If NO, the flow advances to step S30.

In step S28, it is determined whether the timer Ti has timed out. If YES in step S28, the flow returns to step S2. If NO, the flow returns to step S14.

In step S30, whether an NSS/TSI/DCS signal of V.21 signal is received. If YES in step S30, the flow advances to step S32. If NO, the flow advances to step S34.

In step S32, V.21 protocol and V.27ter, V.29, or V17 image transmission are executed.

In step S34, it is determined whether the timer T4 has timed out. If YES in step S34, the flow advances to step S36. If NO, the flow returns to step S26.

In step S36, it is determined whether the timer T1 has timed out. If YES in step S36, the flow returns to step S2. If NO, the flow returns to step S22.

In step S38, it is determined on the basis of the received CM signal whether V.34 half-duplex communication is available. If YES in step S38, the flow advances to step S40. If NO, the flow advances to step S46.

In step S40, a JM signal indicating that V.21, V.27ter, V.29 half-duplex communication, V.17, and V.34 half-duplex communication are available is transmitted. In step S42, the CJ signal is received. In step S44, INFO0a is transmitted. Subsequently, image transmission is executed in accordance with the V.34 protocol.

In step S46, it is determined whether the timer has timed out. If YES in step S46, the flow advances to step S48. If NO, the flow returns to step S46.

In step S48, the NSF/CSI/DIS signal of V.21 signal is transmitted to indicate the absence of the V.8 receive function. In step S50, 3 sec is set to the timer T4.

In step S52, it is determined whether the NSS/TSI/DCS signal of V.21 signal is received. If YES in step S26, the flow returns to step S32. If NO, the flow advances to step S54.

In step S54, it is determined whether the timer T4 has timed out. If YES in step S54, the flow advances to step S56. If NO, the flow returns to step S52.

In step S56, it is determined whether the timer T1 has timed out. If YES in step S56, the flow returns to step S2. If NO, the flow returns to step S48.

The transmission control protocol will be described next.

The transmission control protocol from reception of the ANSam signal from a called terminal to execution of the V.34 protocol and image transmission will be described first.

Figure 5:
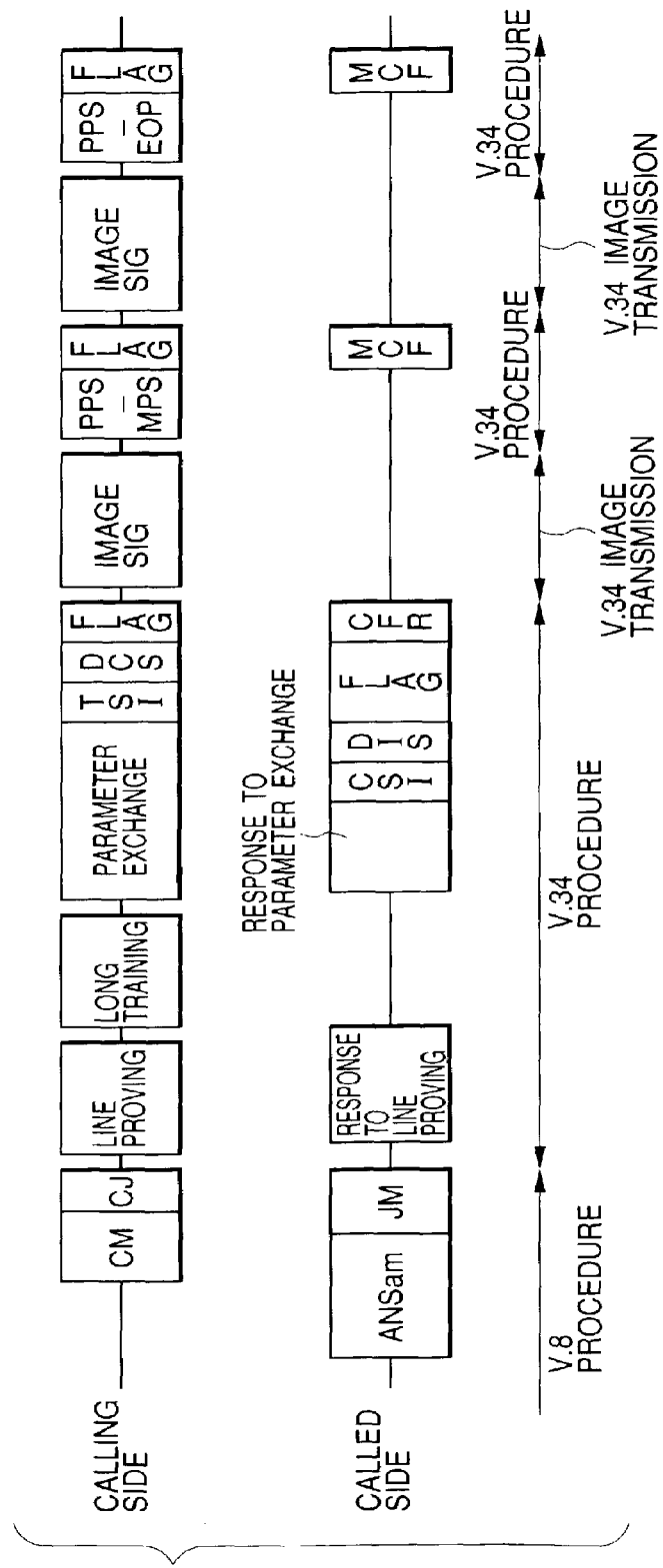
FIG. 5 is a view showing an example of the transmission control protocol applied to the facsimile apparatus FS1.

FIG. 5 is a view showing an example of the transmission control protocol applied to the facsimile apparatus FS1.

Referring to FIG. 5, the called terminal sends out a signal (ANSam signal with 2,100 Hz modulated at 15 Hz) that enables full-duplex communication. The calling side sends out the CM signal by modulation based on V.8. With this CM signal, the called terminal is notified of transmission modes executable in image transmission.

Upon receiving the CM signal, the called terminal notifies the calling terminal of a receivable transmission mode (V.34) in the transmission modes designated by the CM signal. The JM signal is used for this notification.

Upon receiving the JM signal, the calling terminal sends out the CJ signal to notify the called terminal of the transmission mode.

After the CJ signal is transmitted, i.e., after the elapse of 50 msec from the end of V.8 protocol, the calling terminal starts executing the V.34 protocol to send out a line proving signal (signal with INFO0c at its head) for checking the situation of the telephone line 2a. The called terminal sends a signal (signal with INFO0a at its start) responding to the line proving signal from the calling terminal. With this signal, the calling terminal is notified of the subsequent send-out level, amplitude level correction, and transmission baud rate.

After the elapse of 50 msec from the send-out of the line proving signal, the calling terminal sends out a long training signal. On the basis of this long training signal, the called terminal adjusts the equalizer of the modem or detects timing.

After the elapse of 50 msec from the send-out of the long training signal, the calling terminal sends out a parameter exchange signal. The called terminal sends out a signal responding to the parameter exchange signal. With this signal, the calling terminal is notified of the subsequent link correction and bit rate.

After responding to the parameter exchange signal, the called terminal sends out CSI and DIS signals, and also a flag until TSI and DCS signals from the calling terminal are received. After the TSI and DCS signals are received, the called terminal sends out a CFR signal. After reception of the CSI and DTS signal, the calling terminal sends out the TSI and DCS signals, and also a flag until the CFR signal is received from the called terminal.

After the elapse of 50 msec from the send-out of the flag, the calling terminal starts image transmission by V.34 to send out an image signal. After the elapse of 50 msec from the end of image signal send-out, the V.34 protocol is executed. The calling terminal sends out a PPS-MPS signal, and also a flag until an MCF signal from the called terminal is received. After reception of the PPS-MPS signal, the called terminal sends out the MCF signal.

After the elapse of 50 msec from the send-out of the flag, image transmission by V.34 is executed. The calling terminal sends out the image signal again. After the elapse of 50 msec from the send-out of the image signal, the V.34 protocol is executed. The calling terminal sends out a PPS-EOP signal, and also a flag until the MCF signal is received. After reception of the PPS-EOP signal, the called terminal sends out the MCF signal. The above protocol is repeated until image transmission is ended.

The transmission control protocol from reception of the ANSam signal from the called terminal to execution of the V.21 protocol and V.17 image transmission will be described next.

Figure 6:
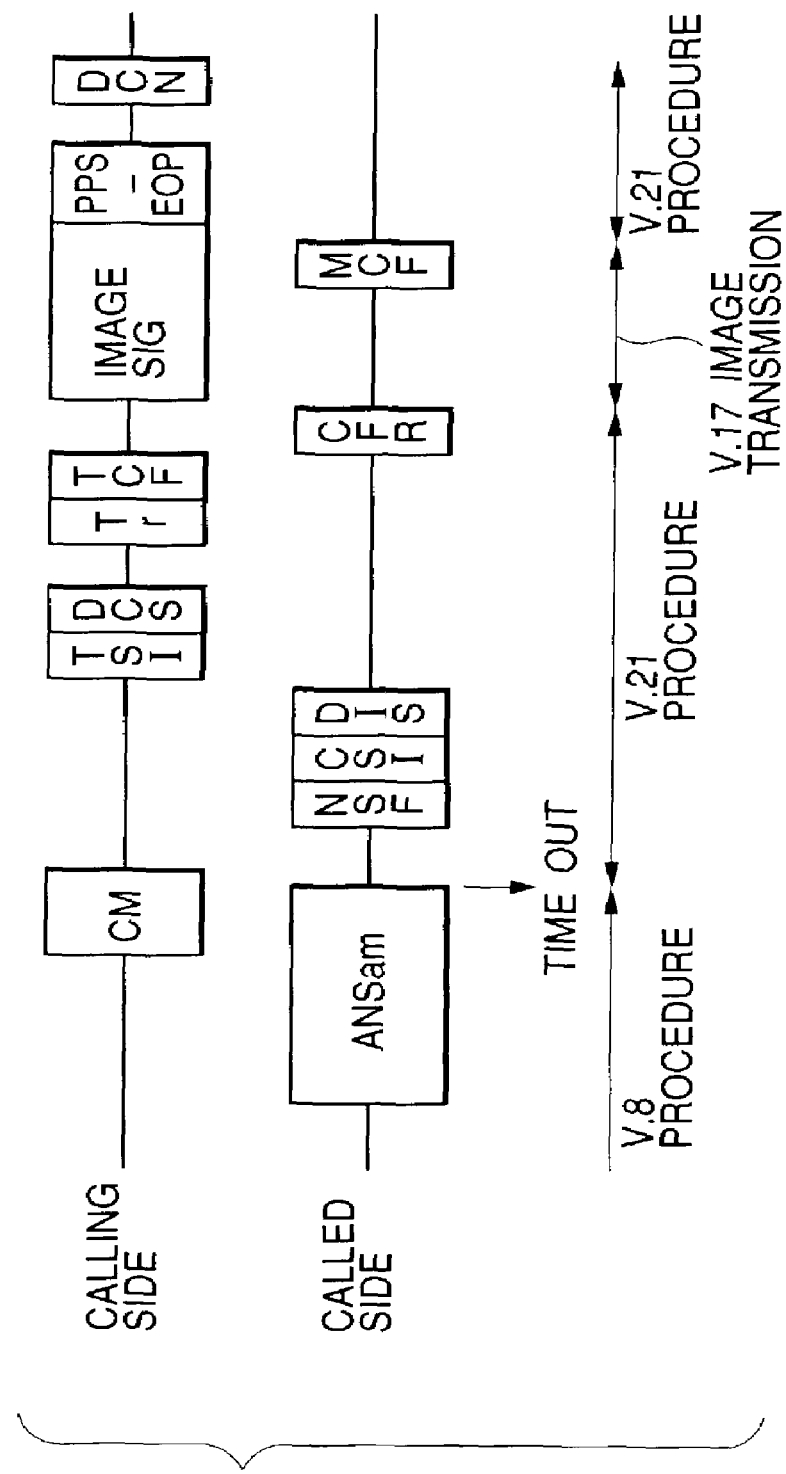
FIG. 6 is a view showing another example of the transmission control protocol applied to the facsimile apparatus FS1.

FIG. 6 is a view showing another example of the transmission control protocol applied to the facsimile apparatus FS1.

First, the called terminal transmits the ANSam signal. The calling side transmits the CM signal indicating that V.17 communication is available. At this time, if the ANSam signal transmission timer has timed out, the receiver transmits the NSF/CSI/DIS signal of V.21 protocol (the DIS signal notifies the calling terminal of the absence of V.8 receive function). In correspondence with this signal, the calling terminal transmits the NSS/TSI/DCS signal and subsequently determines the rate by a training check signal. Then, V.17 image transmission is executed.

According to this embodiment, when the ANSam signal is transmitted, and then, the CM signal indicating V.17 communication is received, the called terminal does not respond to the CM signal. After the transmission time of the ANSam signal is out, a V.21 DIS signal is transmitted. With this method, the V.21 protocol can be reliably executed, and V.27ter, V.29, or V.17 image information can be received. In addition, when the CM signal indicating V.34 communication is received, the called terminal responds to the CM signal and transmits the JM signal. After that, after the CJ signal is received, V.34 reception can be executed.

Second Embodiment

The same reference numerals as in the first embodiment denote the same parts in the second embodiment, and a description thereof will be omitted. Only different parts will be described below.

The second embodiment is different from the first embodiment in control by the control circuit 20. In this embodiment, in a facsimile apparatus FS1 which executes a protocol defined by ITU-T recommendation V.8 with respect to the partner apparatus and sets, on the basis of the protocol, an image transmission mode executable with-respect to the partner apparatus, the ANSam signal reception means and the CM signal transmission means are prepared. The apparatus receives the ANSam signal and then transmits the CM signal indicating V.34 communication. When the JM signal indicating that V.34 communication is unavailable is received from the partner apparatus, communication is interrupted.

When the JM signal indicating that V.34 communication is unavailable is received from the partner receiver, the line is released without transmitting the CJ signal. The JM signal from the partner receiver is assumed to indicate that V.21 communication is available and that at least one of V.17, V.29, and V.27ter communication is available.

In re-calling after the JM signal indicating that V.34 communication is unavailable is received from the partner receiver, following the release of the line, the V.21 protocol, V.17, V.29, or V.27ter high-speed communication is executed without executing the V.8 protocol.

More specifically, in re-calling after the JM signal indicating that V.34 communication is unavailable is received from the partner receiver, following the disconnection of the communication, no CM signal is transmitted upon receiving the ANSam signal, and the V.21 protocol, V.17, V.29, or V.27ter high-speed communication is executed upon receiving a V.21 DIS signal.

Figure 14:
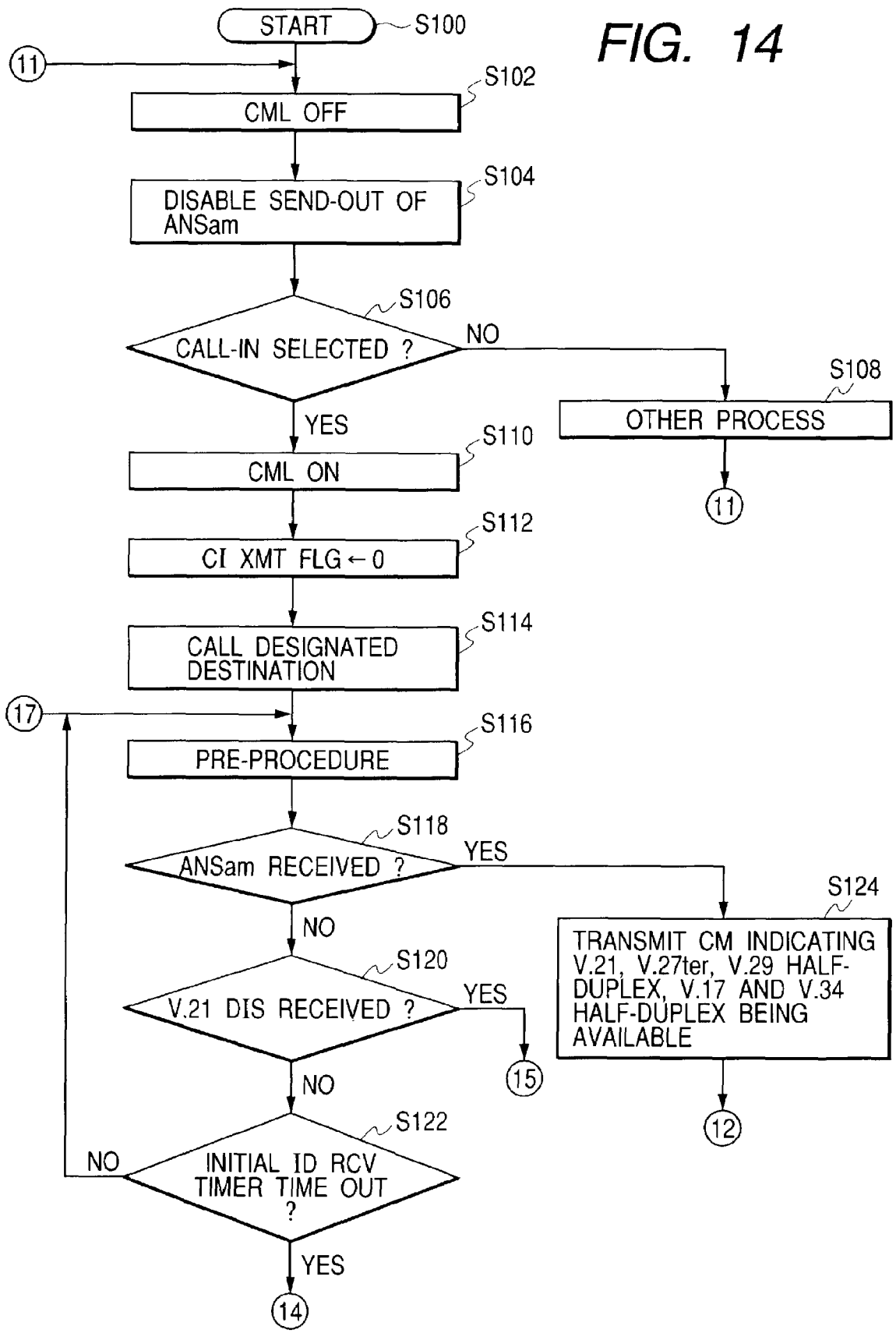
FIG. 14 is a flow chart showing the operation of the second embodiment.
Figure 15:
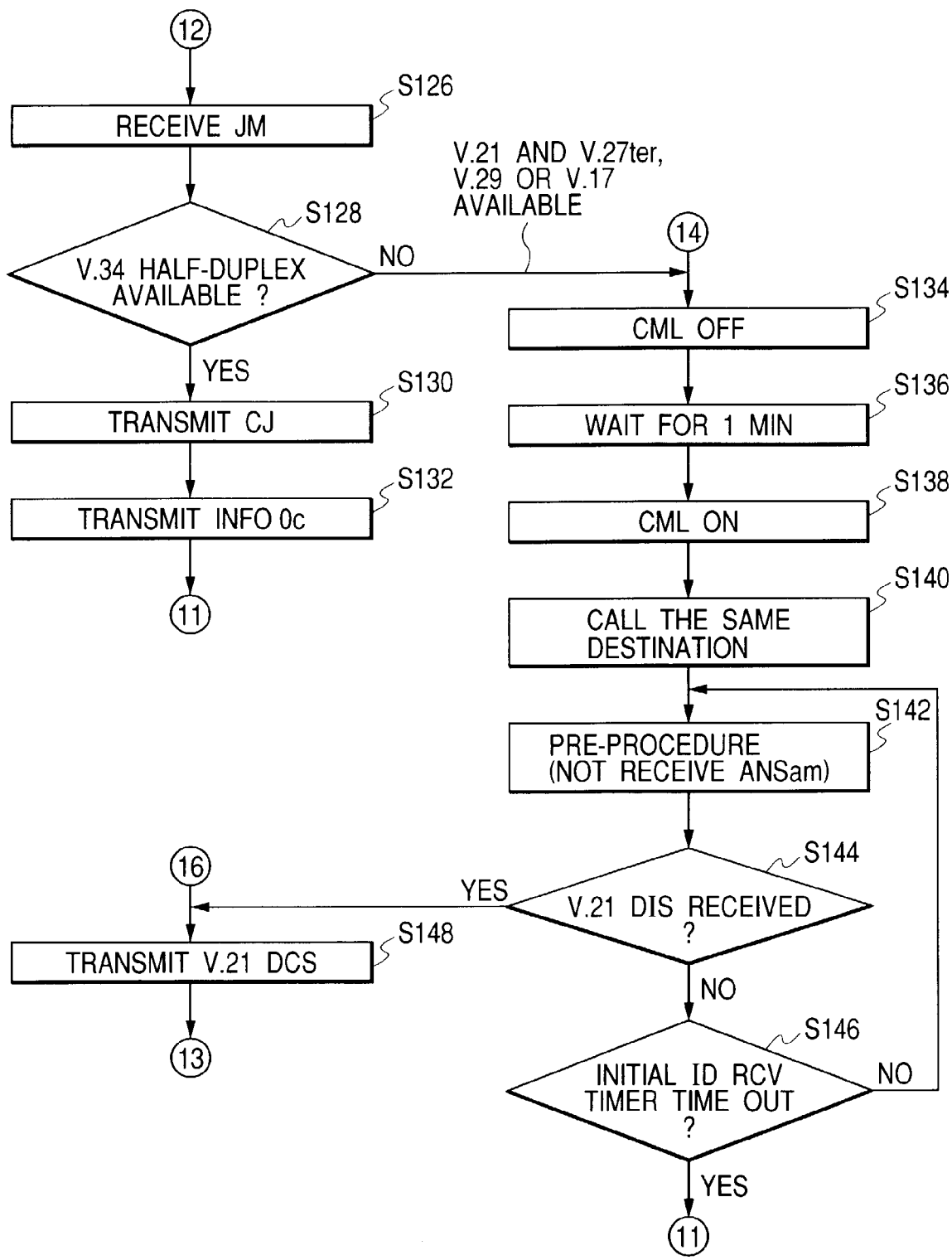
FIG. 15 is a flow chart showing the operation of the second embodiment.
Figure 16:
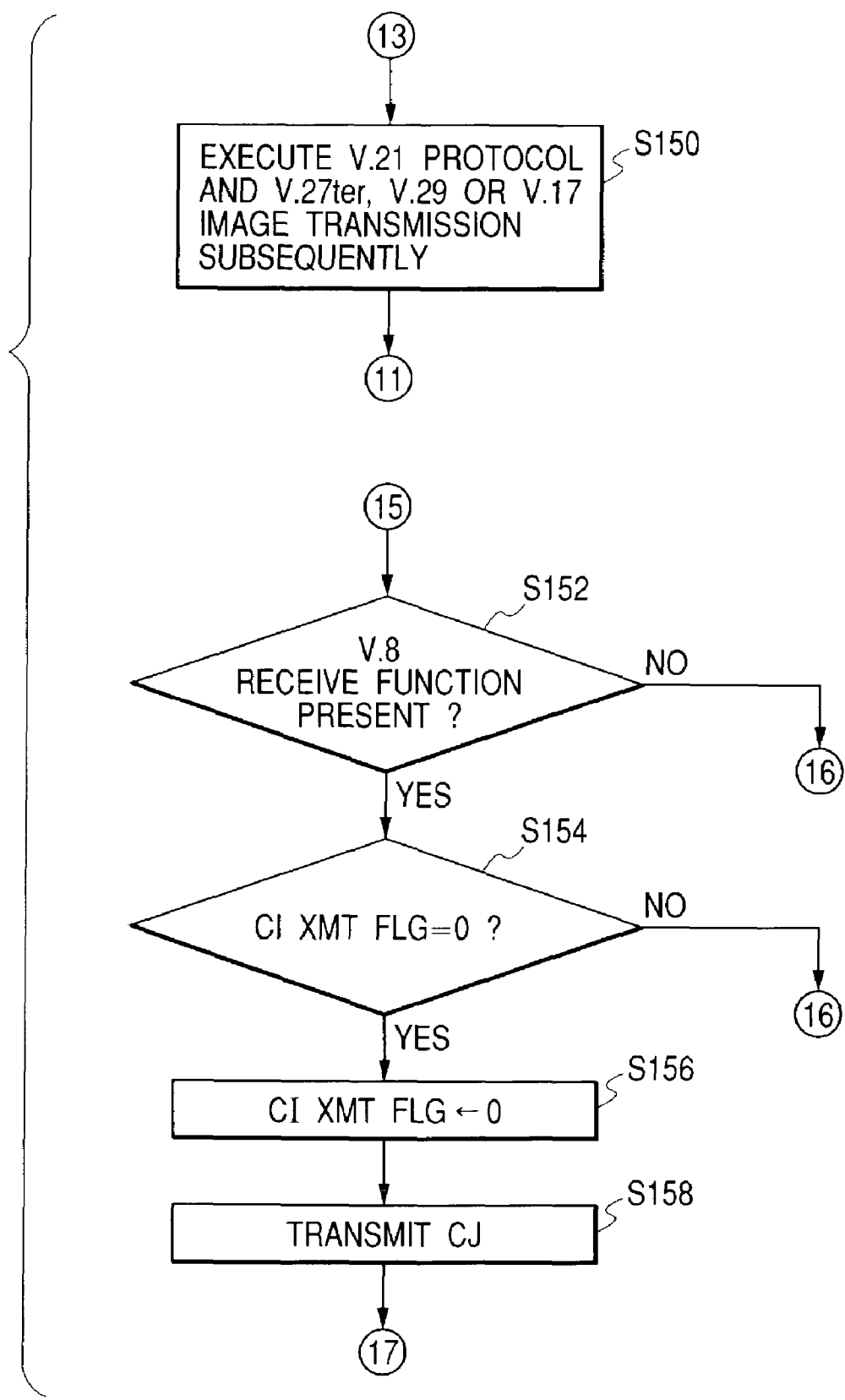
FIG. 16 is a flow chart showing the operation of the second embodiment.

FIGS. 14, 15, and 16 are flow charts showing the operation of this embodiment.

In step S102, a signal of level "0" is output to a signal line 20a to turn off CML. In step S104, a signal of level "0" is output to a signal line 20d to disable output of the ANSam signal.

In step S106, it is determined whether calling is selected. If NO in step S106, the flow advances to step S108. If YES, the flow advances to step S110.

In step S108, other process is executed. After other process is executed, the flow returns to step S102.

In step S110, a signal of level "1" is output to the signal line 20a to turn on CML. In step S112, 0 is set to a CI transmission flag. In step S114, a designated destination is called using a calling circuit. In step S116, a pre-procedure is executed.

In step S118, it is determined whether the ANSam signal is received. If YES in step S118, the flow advances to step S124. If NO, the flow advances to step S120.

In step S120, it is determined whether the V.21 DIS signal is received. If YES in step S120, the flow advances to step S152. If NO, the flow advances to step S122.

In step S122, it is determined whether the reception timer of an initial ID signal has timed out. If YES in step S122, the flow advances to step S134. If NO, the flow returns to step S116.

In step S124, the CM signal indicating V.21, V.27ter, V.29 half-duplex, V.17, or V.34 half-duplex communication is transmitted. In step S126, a V.8 JM signal is received.

In step S128, it is determined on the basis of the received JM signal whether V.34 half-duplex communication is available. If YES in step S128, the flow advances to step S130. If NO, the flow advances to step S134.

In step S130, the CJ signal is transmitted. In step S132, INFO0c is transmitted. After that, V.34 protocol and image transmission are executed. In step S134, a signal of level "0" is output to the signal line 20a to turn off CML. In step S136, processing waits for 1 min. In step S138, a signal of level "1" is output to the signal line 20a to turn on CML.

In step S140, the same destination as described above is called using the calling circuit. In step S142, the pre-procedure is executed. At this time, no ANSam signal is received.

In step S144, it is determined whether the V.21 DIS signal is received. If YES in step S144, the flow advances to step S148. If NO, the flow advances to step S146.

In step S146, it is determined whether the reception timer of the initial ID signal has timed out. If YES in step S146, the flow returns to step S102. If NO, the flow returns to step S142.

In step S148, the V.21 DCS signal is transmitted. In step S150, the V.21 protocol, V.27ter, V.29, or V.17 image transmission is executed.

In step S152, it is determined whether the V.8 receive function is present. If YES in step S152, the flow advances to step S154. If NO, the flow returns to step S148.

In step S154, it is determined whether the CI transmission flag is 0. If YES in step S154, the flow advances to step S156. If NO, the flow returns to step S148.

In step S156, 1 is set to the CI transmission flag. In step S158, the CJ signal is transmitted.

The transmission control protocol from reception of the ANSam signal from the called terminal to execution of the V.34 protocol and image transmission will be described next.

FIG. 5 is a view showing an example of the transmission control protocol applied to the facsimile apparatus FS1.

The transmission control protocol shown in FIG. 5 has already been described in the first embodiment, and a description thereof will be omitted here.

A transmission control protocol of the above embodiment will be described next, in which if the ANSam signal is received from the called terminal and it is notified that V.34 communication by the V.8 protocol is not available, the line is released, and in re-calling, the V.21 DCS signal is transmitted in response to the V.21 DIS signal without responding to the ANSam signal.

Figure 17:
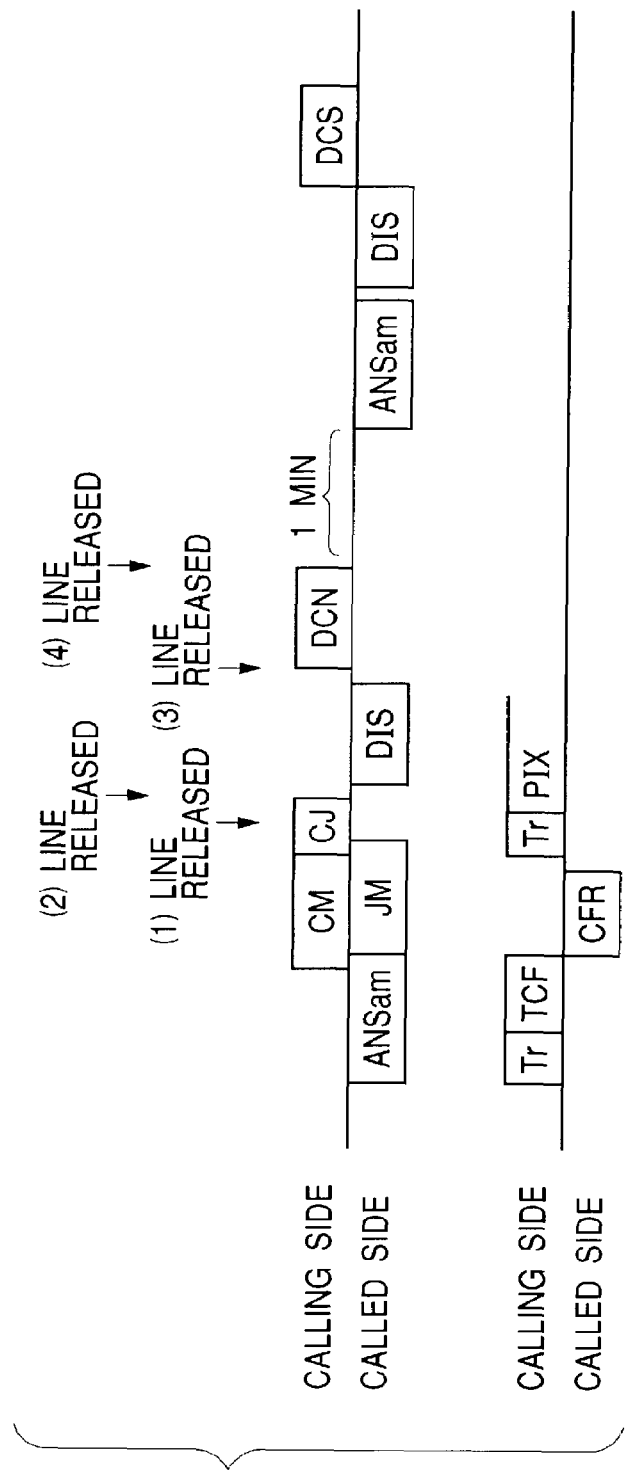
FIG. 17 is a view showing another example of the transmission control protocol applied to a facsimile apparatus FS1 in the second embodiment.

FIG. 17 is a view showing another example of the transmission control protocol applied to a facsimile apparatus FS1.

Referring to FIG. 17, first, the called terminal transmits the ANSam signal. The calling terminal transmits the CM signal indicating that V.34 communication is available. After receiving the CM signal, the receiver transmits the JM signal indicating that V.17 communication is available (V.34 communication is unavailable). In the second embodiment, the calling terminal immediately releases the line on the basis of reception of the JM signal (the line is released at timing (1) in FIG. 17).

After the elapse of a predetermined time, the calling terminal calls again. The calling terminal transmits the V.21 TSI/DCS signal in response to the V.21 DIS signal without responding to the ANSam signal, and executes V.21 protocol, V.27ter, V.29, or, V.17 image transmission.

Third Embodiment

In the third embodiment of the present invention, when the JM signal indicating that V.34 communication is unavailable is received from the partner receiver in the arrangement of the second embodiment, the CJ signal is transmitted, and then, the line is released.

That is, the line is released at timing (2) in FIG. 17, and the sequence advances to re-calling.

Figure 18:
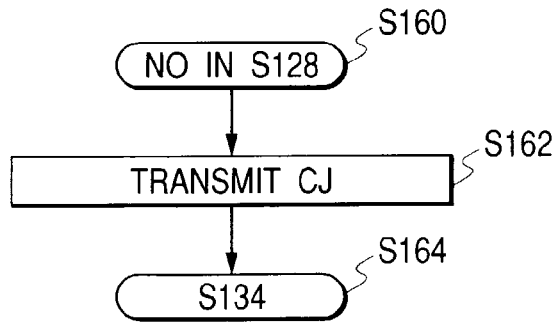
FIG. 18 is a flow chart showing the operation of the third embodiment.

FIG. 18 is a flow chart showing the operation of the third embodiment of the present invention.

The flow chart in FIG. 18 shows only operation different from that in the flow charts shown in FIGS. 14 to 16.

Step S160 indicates NO in step S128. Step S162 indicates transmission of the V.8 CJ signal.

Step S164 indicates step S134.

Fourth Embodiment

In the fourth embodiment of the present invention, when the JM signal indicating that V.34 communication is unavailable is received from the partner receiver in the arrangement of the second embodiment, the CJ signal is transmitted, the V.21 DIS signal from the partner receiver is received, and then, the line is released.

That is, the line is released at timing (3) in FIG. 17, and the sequence advances to re-calling.

Figure 19:
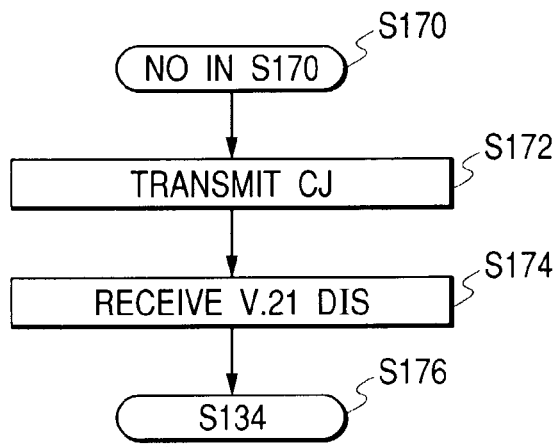
FIG. 19 is a flow chart showing the operation of the fourth embodiment.

FIG. 19 is a flow chart showing the operation of the fourth embodiment.

The flow chart in FIG. 19 shows only control operation different from that shown in FIGS. 14 to 16.

Step S170 indicates NO in step S128. Step S172 indicates transmission of the V.8 CJ signal. Step S174 indicates reception of the V.21 DIS signal. Step S174 indicates step S134.

Fifth Embodiment

In the fifth embodiment of the present invention, when the JM signal indicating that V.34 communication is unavailable is received from the partner receiver in the arrangement of the second embodiment, the CJ signal is transmitted, the V.21 DIS signal is received from the partner receiver, the V.21 DCN signal is transmitted, and then, the line is released.

That is, in the fifth embodiment, the line is released at timing (4) in FIG. 17, and the sequence advances to re-calling.

Figure 20:
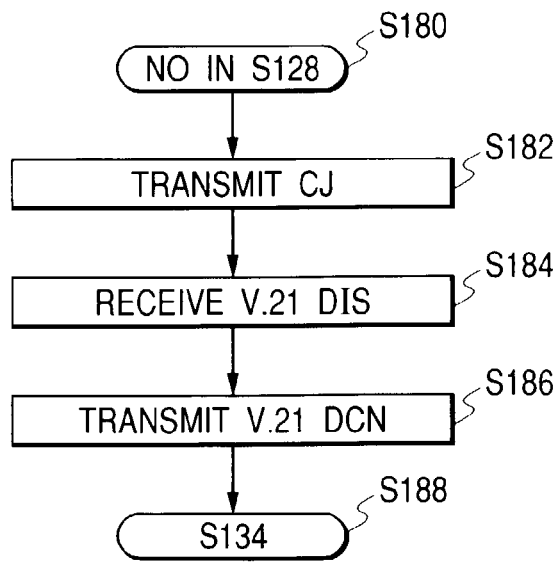
FIG. 20 is a flow chart showing the operation of the fifth embodiment.

FIG. 20 is a flow chart showing the operation of the fifth embodiment.

FIG. 20 shows only control operation different from that shown in FIGS. 14 to 16.

Step S180 indicates NO in step S128. Step S182 indicates transmission of the V.8 CJ signal. Step S184 indicates reception of the V.21 DIS signal. Step S186 indicates transmission of the V.21 DCN signal. Step S188 indicates step S134.

According to the present invention, when the transmitter which supports V.34 communication issues a call, receives the ANSam signal from the receiver, transmits the CM signal indicating V.34 communication, and then receives the JM signal indicating that V.34 communication is unavailable from the receiver, any operation error is not cancel by the subsequent execution of the V.8 protocol. Therefore, the line can immediately be released to interrupt communication. Hence, any increase in communication fee due to continuation of unavailable communication can be prevented, and the convenience can be increased.

In addition, even when the V.21 DIS signal indicating the presence of the V.8 receive function is received after execution of V.8 communication, V.17 communication can be executed without executing the V.8 protocol.

What is claimed is:

1. A facsimile communication apparatus for executing a protocol defined in ITU-T recommendation V.8 with respect to a partner apparatus and setting an image transmission mode executable with respect to the partner apparatus on the basis of the protocol, comprising:
   ANS am signal transmission means;
   CM signal reception means; and
   control means for skipping transmission of a JM signal and transmitting a V.21 DIS signal, in response to reception of a CM signal indicating V.17 communication.

2. An apparatus according to claim 1, wherein the V.21 DIS signal transmitted when the CM signal indicating V.17 communication is received declares an absence of a V.8 receive function.

3. An apparatus according to claim 2, wherein when a CM signal indicating V.34 communication is received,the JM signal is transmitted in reply to the CM signal, and then, after a CJ signal is received, V.34 reception is executed.

4. A facsimile communication method of executing a protocol defined in ITU-T recommendation V.8 with respect to a partner apparatus and setting an image transmission mode executable with respect to the partner apparatus on the basis of the protocol, comprising:
   an ANSam signal transmission step;
   a CM signal reception step; and
   a control step for skipping transmission of a JM signal and transmitting a V.21 DIS signal, in response to reception of a CM signal indicating V.17 communication.

5. A method according to claim 4, wherein the V.21 DIS signal transmitted when the CM signal indicating V.17 communication is received declares an absence of a V.8 receive function.

6. A method according to claim 5, wherein when a CM signal indicating V.34 communication is received, the JM signal is transmitted in reply to the CM signal, and then, after a CJ signal is received, V.34 reception is executed.

7. A facsimile communication apparatus for executing a protocol defined in ITU-T recommendation V.8 with respect to a partner apparatus and setting an image transmission mode executable with respect to the partner apparatus on the basis of the protocol, comprising:
   ANSam signal reception means for receiving an ANSam signal;
   CM signal transmission means for transmitting a CM signal; and
   control means for disconnecting a communication line in response to reception of a JM signal indicating that V.34 communication is unavailable,
   wherein in re-calling executed when the communication is disconnected upon receiving the JM signal indicating that V.34 communication is unavailable from the partner receiver, no CM signal is transmitted in response to reception of the ANSam signal, and a V.21 protocol, and V.17, V.29, or V.27ter high-speed communication are executed in response to reception of a V.21 DIS signal.

8. A facsimile communication method of executing a protocol defined in ITU-T recommendation V.8 with respect to a partner apparatus and setting an image transmission mode executable with respect to the partner apparatus on the basis of the protocol, comprising:
   an ANSam signal reception step for receiving an ANSam signal;
   a CM signal transmission step for transmitting a CM signal; and
   a control step for disconnection a communication line in response to reception of a JM signal indicating that V.34 communication is unavailable,
   wherein in re-calling executed when the communication is disconnected executed when the communication is interrupted disconnected upon receiving the JM signal indicating that V.34 communication is unavailable from the partner receiver, no CM signal is transmitted in response to reception of the ANSam signal, and a V.21 protocol and V.17, V.29, or V.27ter high-speed communication are executed in response to reception of a V.21 DIS signal.

* * * * *

UNITED STATES PATENT AND TRADEMARK OFFICE
CERTIFICATE OF CORRECTION

PATENT NO. : 7,310,160 B2
APPLICATION NO. : 10/288429
DATED : December 18, 2007
INVENTOR(S) : Takehiro Yoshida It is certified that error appears in the above-identified patent and that said Letters Patent is hereby corrected as shown below:

TITLE PAGE: [57] ABSTRACT

Line 12, "units," should read --unit,--.

COLUMN 1

Line 28, "receiver" should read --receiver,--.
Line 51, "receiver" should read --receiver,--.

COLUMN 4

Line 66, "recommendation" should read --recommendations--.

COLUMN 5

Line 27, "date" should read --data--.

COLUMN 6

Line 16, "timer Ti" should read --timer T1--.

COLUMN 7

Line 17, "baud" should read --band--.
Line 34, "signal," should read --signals,--.

COLUMN 8

Line 27, "with-respect" should read --with respect--.
Line 40, "communication" should read --communications--.

COLUMN 11

Line 11, "cancel" should read --cancelled--.
Line 27, "ANS am" should read --ANSam--.
Line 38, "received,the" should read --received, the--.

UNITED STATES PATENT AND TRADEMARK OFFICE
CERTIFICATE OF CORRECTION

PATENT NO. : 7,310,160 B2
APPLICATION NO. : 10/288429
DATED : December 18, 2007
INVENTOR(S) : Takehiro Yoshida It is certified that error appears in the above-identified patent and that said Letters Patent is hereby corrected as shown below:

<u>COLUMN 12</u>

Line 39, "disconnection" should read --disconnecting--.
Line 43, "executed" should be deleted.
Line 44, "executed when the communication is" should be deleted.
Line 45, "interrupted disconnected" should be deleted.

Signed and Sealed this

Second Day of December, 2008

JON W. DUDAS
*Director of the United States Patent and Trademark Office*